United States Patent
Kirstein

(10) Patent No.: US 7,004,866 B2
(45) Date of Patent: Feb. 28, 2006

(54) SHIFTABLE TOOTHED-BELT DRIVE

(76) Inventor: Gerhard Kirstein, Gunterstrasse 12, Augsburg (DE) D-86152

( * ) Notice: Subject to any disclaimer, the term of this patent is extended or adjusted under 35 U.S.C. 154(b) by 209 days.

(21) Appl. No.: 10/712,453

(22) Filed: Nov. 12, 2003

(65) Prior Publication Data

US 2004/0097309 A1     May 20, 2004

(30) Foreign Application Priority Data

Nov. 12, 2002 (DE) .............................. 102 52 434

(51) Int. Cl.
*F16H 7/08* (2006.01)
(52) U.S. Cl. ........................ 474/148; 474/101
(58) Field of Classification Search .............. 474/47, 474/48, 49, 52, 8, 148, 18, 101, 109
See application file for complete search history.

(56) References Cited

U.S. PATENT DOCUMENTS

| | | | |
|---|---|---|---|
| 3,979,964 A | | 9/1976 | McCordall |
| 4,108,292 A | | 8/1978 | Takano |
| 4,990,123 A | * | 2/1991 | Krude ........................ 474/50 |
| 6,035,561 A | * | 3/2000 | Paytas et al. ................. 37/246 |
| 6,348,019 B1 | * | 2/2002 | Yuan ............................. 474/8 |

FOREIGN PATENT DOCUMENTS

| | | |
|---|---|---|
| DE | 129371 | 7/1901 |
| DE | 2 239 579 | 2/1974 |
| DE | 2518576 A1 | 11/1975 |
| DE | 3123246 A1 | 12/1982 |
| FR | 1112819 | 3/1956 |
| FR | 74 10066 | 10/1975 |
| GB | 989065 | 4/1965 |

* cited by examiner

*Primary Examiner*—Vicky A. Johnson
(74) *Attorney, Agent, or Firm*—Ostrolenk Faber Garb & Soffen, LLP

(57) ABSTRACT

A shiftable toothed-belt drive, containing an engagement and disengagement device, in order alternately to mesh radially and demesh radially a toothed belt, which is guided around at least two gearwheels, with and from at least one of the two gearwheels. A disengager in the form of two externally profiled pulleys is urged axially along the shaft of one of the gearwheels supporting the toothed belt for radially raising the belt and demeshing the belt from the gearwheel. An engager engages the outside of the belt for tensioning the belt sufficiently to counter the effect of the disengager, move the pulleys apart and mesh the belt with the one gearwheel.

11 Claims, 3 Drawing Sheets

SHIFTABLE TOOTHED-BELT DRIVE

BACKGROUND OF THE INVENTION

The invention relates to a shiftable toothed-belt drive using a plurality of gearwheels and particularly to meshing and demeshing the belt and gearwheels.

The invention accordingly relates to a shiftable toothed-belt drive containing at least one drive set which has at least two gearwheels arranged axially parallel and at a distance from one another and a toothed belt which extends around these gear wheels. The teeth of the belt can mesh into the teeth of the gearwheels.

The shiftable toothed-belt drive according to the invention is suitable for driving any desired machines, but, in particular, also as a travel drive for motor vehicles, such as passenger cars, motor trucks and motor cycles, and also for motorboats and motor ships.

SUMMARY OF THE INVENTION

The invention is to achieve the object of providing a shiftable toothed-belt drive which runs quietly, can be shifted easily and quickly, is operationally reliable and has a long useful life.

This object is achieved, according to the invention, by a shiftable toothed-belt drive, containing an engagement and disengagement device, in order alternately to mesh radially and demesh radially a toothed belt, which is guided around at least two gearwheels, with and from at least one of the two gearwheels. A disengager in the form of two externally profiled pulleys is urged axially along the shaft of one of the gearwheels supporting the toothed belt for radially raising the belt and demeshing the belt from the gearwheel. An engager engages the outside of the belt for tensioning the belt sufficiently to counter the effect of the engager, move the pulleys apart and mesh the belt with the one gearwheel.

Other features and advantages of the present invention will become apparent from the following description of the invention which refers to the accompanying drawings.

BRIEF DESCRIPTION OF THE DRAWINGS

The invention is described below by means of preferred exemplary embodiments, with reference to the drawings in which.

DESCRIPTION OF PREFERRED EMBODIMENTS

Figure 1:
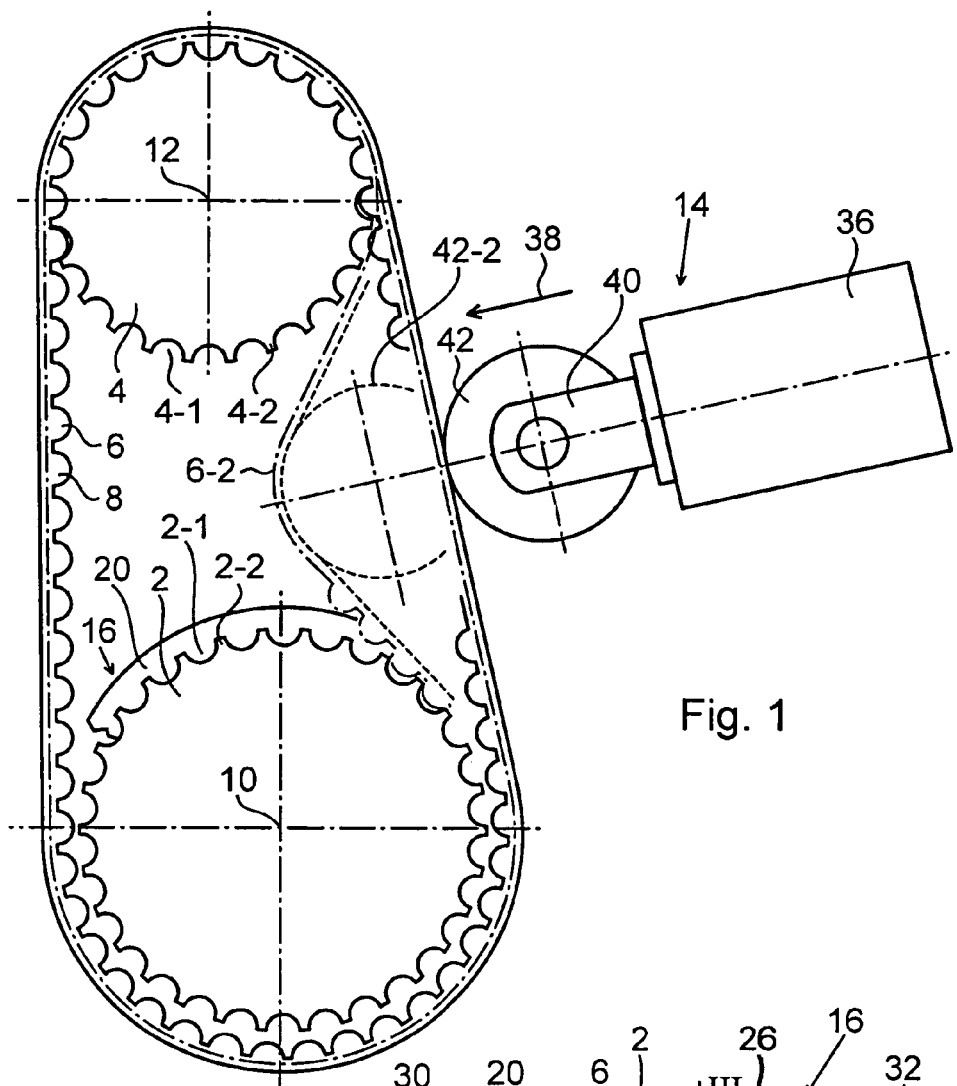
FIG. 1 shows diagrammatically, and not true to scale, a side view of a shiftable toothed-belt drive according to the invention, as seen in the cross section I of FIG. 2.
Figure 2:
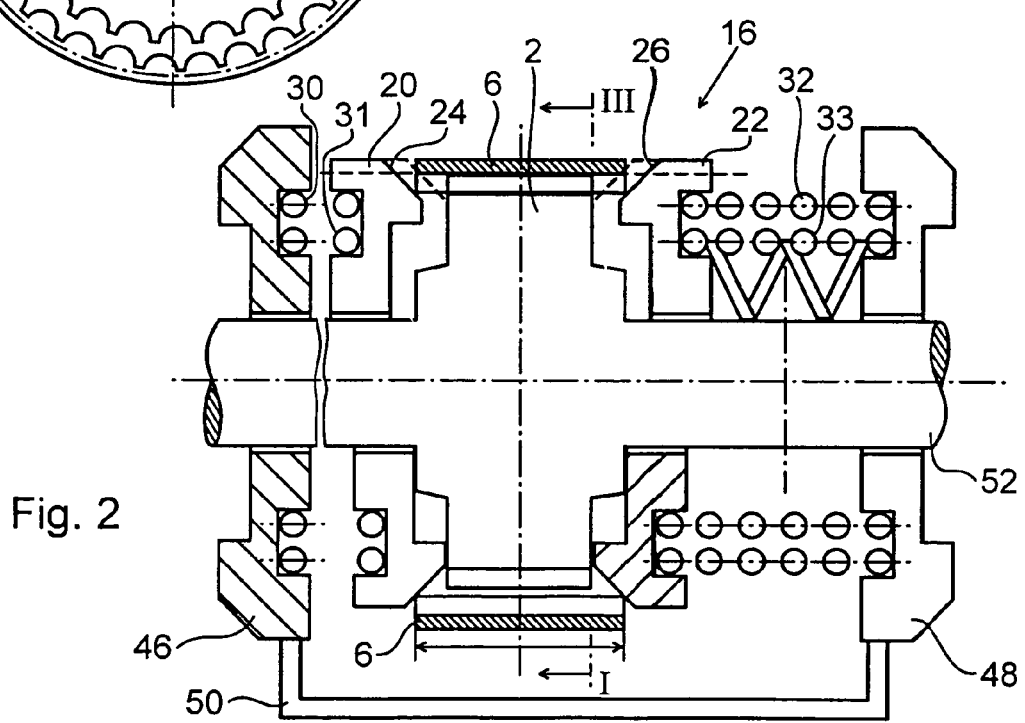
FIG. 2 shows an axial section through part of FIG. 1.
Figure 3:
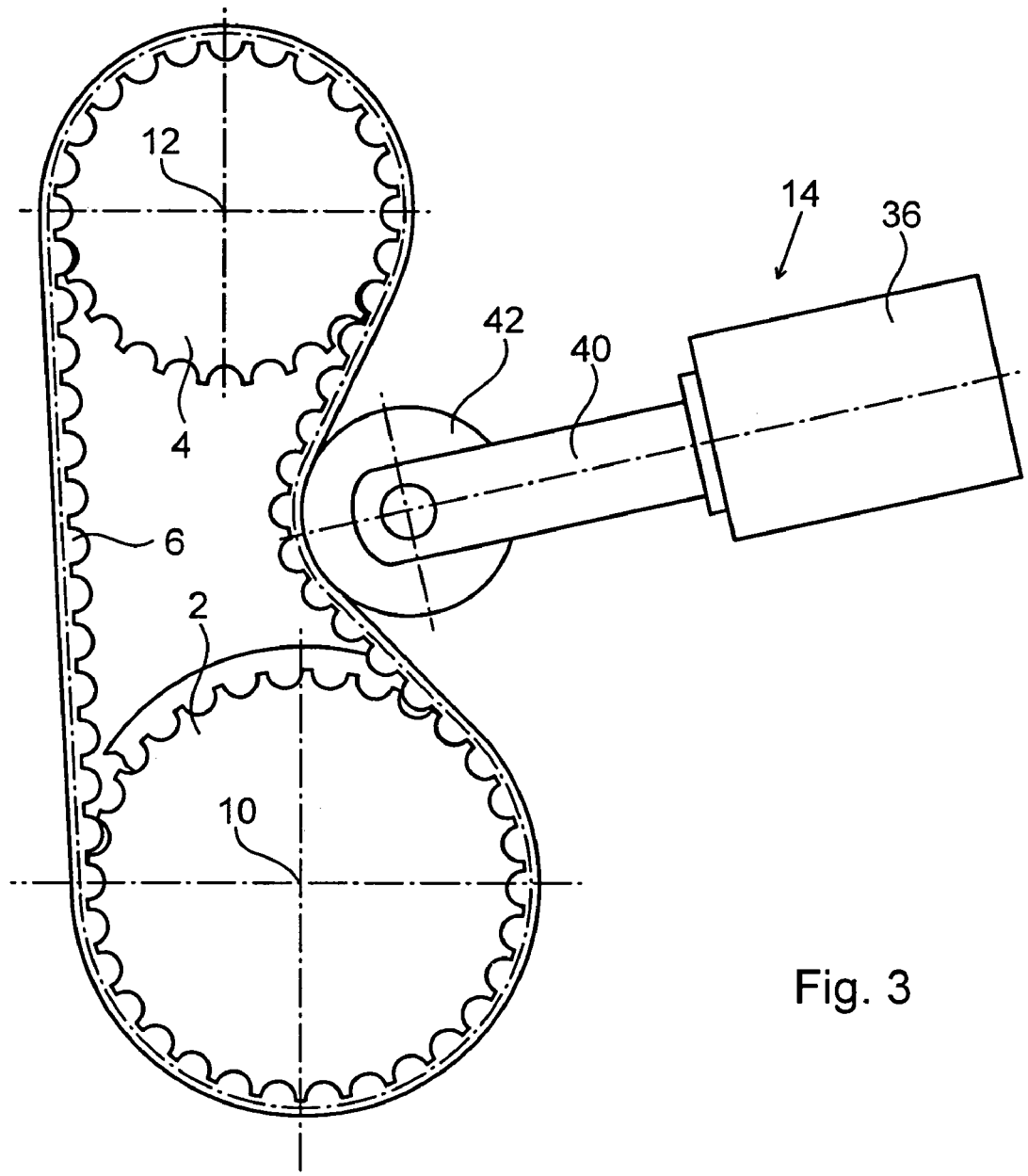
FIG. 3 shows the shiftable toothed-belt drive of FIG. 1, with the toothed belt in meshed position with both gearwheels, corresponding to the upper half of FIG. 2.

The shiftable toothed-belt drive according to the invention, shown in FIGS. 1 to 3, contains at least one drive set which has at least two gearwheels 2 and 4 which are arranged axially parallel and at a distance from one another, and a toothed belt 6 which extends around these gearwheels 2, 4. The teeth of the belt can mesh into the spaces 2-1 and 4-1 between the teeth 2-2 and 4-2 of the gearwheels 2 and 4. The gearwheels 2 and 4 are arranged rotatably about respective axes of rotation 10 and 12.

An engagement and disengagement device 14, 16 is provided, in order alternately to mesh and demesh the toothed belt 6 with and from at least one of the two gearwheels, in the present case with and from the gearwheel 2.

In FIG. 1, a toothed belt is shown demeshed from one of the gearwheels, but capable of being meshed according to broken lines, while the toothed belt is constantly meshed with another gearwheel, and shows the toothed belt 6 in the demeshed position from one gearwheel 2 and in the meshed position with the other gearwheel 4.

FIG. 2 shows an engagement and disengagement device. In the lower half of FIG. 2, the device is in a disengagement position, in which the toothed belt is shown in the demeshed position in relation to the gearwheel, while in the upper half of FIG. 2, the engagement and disengagement device is in the engagement position and consequently the toothed belt is in the meshed position with the gearwheel.

FIG. 3 shows the toothed belt 6 in its meshed position with both gearwheels 2 and 4.

In the case of the gearwheel 2 shown in FIG. 2, where the toothed belt 6 is to be meshed and demeshed, the engagement and disengagement device 14, 16 comprises a split belt pulley with two axially spaced pulleys 20, 22 which are arranged on both sides of the gearwheel 2 and are arranged to be axially displaceable in relation to the gearwheel 2 and to be freely rotatable about the axis of rotation 10 of the wheel. The two pulleys 20 and 22 have a circular belt running surface 24 and 26 on each of their sides facing one another. The belt running surfaces descend in the axial direction toward one another and descend obliquely to the axis of rotation 10, so that they form between them a V-groove for receiving the toothed belt 6. The belt running surfaces 24 and 26 roll on lateral edges of the toothed belt 6.

The engagement and disengagement device 14, 16 contains a disengager 16, which can exert an axial force on the two pulleys 20 and 22 to urge them axially in the direction toward one another. As a result, the two pulleys 20 and 22 can be moved axially toward one another to an extent such that they lift the toothed belt 6 radially off the gearwheel 2 arranged between them and consequently bring the toothed belt radially from the meshed position shown in FIG. 3 into the demeshed position shown in FIG. 1. In this case, the toothed belt 6 runs on the belt running surfaces 24, 26 of the pulleys 20, 22 from a smaller to a larger pulley diameter.

Moreover, the engagement and disengagement device 14, 16 includes an engager 14, which can exert on the toothed belt 6, particularly on its outside, and transversely to the axes of rotation 10, 12 of the gearwheels 2, 4, an engagement force which tensions the toothed belt 6 to an extent such that the belt can press the two pulleys 20, 22 axially away from one another to an extent such that the belt moves in relation to the gearwheel 2 from the demeshed position of FIG. 1 into the meshed position of FIG. 3. In this case, the toothed belt 6 runs on the belt running surfaces 24, 26 of the pulleys 20, 22 from a larger to a smaller pulley diameter.

In the embodiment according to FIGS. 1 to 3, the disengager 16 includes disengagement spring means 30, 31, 32 and 33 for generating the disengagement force, which prestress the two pulleys 20 and 22 resiliently elastically in the axial direction toward one another. This prestress forms a disengagement force, by means of which the two pulleys 20 and 22 can be pressed axially more closely together, for lifting the toothed belt 6 radially off the gearwheel 2 and consequently bringing the belt from the meshed position of FIG. 3 into the demeshed position of FIG. 1.

The engager 14 has an actuating drive for generating the engagement force in a direction which is illustrated by arrow 38 in FIG. 1. The force is such that it can overcome the resiliently elastic disengagement force of the disengager 16. The two pulleys 20, 22 are capable of being pressed axially away from one another, counter to the force of the disengagement spring means 30, 31, 32, 33, by the tensile stress in the toothed belt 6, so that the toothed belt 6 can be meshed radially with the gearwheel 2 after the radial movement of the toothed belt from the demeshed position of FIG. 1 into the meshed position of FIG. 3.

The disengagement spring means 30, 31, 32 and 33 exert their disengagement force constantly, whereas the servomotor 36 of the engager 14 exerts its engagement force only as required.

The servomotor 36 may be a linear actuating drive or a spindle drive. Preferably, it has an axially extendable tappet 40. This tappet 40 preferably does not press directly onto the toothed belt 6, since that would cause frictional contact between them, but, instead, presses via a roller 42 which is mounted rotatably on the tappet 40 and which is in rolling contact with the belt outside of the toothed belt 6, the belt outside facing away from the toothing 8. FIG. 1 shows the roller 42 in the disengagement position by unbroken lines and in an engagement position 42-2 by broken lines, with a portion 6-2 of the toothed belt 6 also being depicted in the engagement position by broken lines. FIG. 3 shows the engager 14 in its engagement position by unbroken lines and consequently shows the toothed belt 6 in the meshed position with both gearwheels 2 and 4.

The engager 14, in particular its roller 42, may, in the disengagement position, bear against the toothed belt 6 according to FIG. 1 or be spaced apart from the toothed belt 6, in order to avoid energy losses. If the engager 14, in particular its roller 42, bears against the toothed belt 6 in the engagement position of FIG. 1, it may be expedient to provide a prestressing spring which presses the roller 42 resiliently elastically onto the toothed belt 6, in order to prevent the roller 42 from hopping on the toothed belt 6. However, such a prestressing spring has only a low spring force such that it cannot overcome the disengagement spring force of the disengagement spring means 30, 31, 32 and 33 of the disengager 16.

The upper half of FIG. 2 shows the disengager 16 in the engaged position, in which the toothed belt 6 is meshed with the gearwheel 2 according to FIG. 3 and the lower half of FIG. 2 shows the disengager in the disengagement position, in which the toothed belt 6 is not meshed with the gearwheel 2, but is in its demeshed position according to FIG. 1.

The disengagement spring means 30, 31, 32 and 33 may comprise two compression springs 30 and 32 or, according to FIG. 2, also two pairs 30, 31 and 32, 33 of compression springs, which are clamped axially with prestress between the respective outer end faces, facing away from one another, of the pulleys 20 and 22 and the inner end faces, axially opposite these, of respective counterpressure elements 46 and 48. The counterpressure elements 46 and 48 are held at a defined and invariable axial distance both from one another and from the gearwheel 2 which is located between the pulleys 20 and 22. This is illustrated diagrammatically in FIG. 2 by a connecting yoke 50 which connects the two counterpressure elements 46 and 48. Instead of such a connecting yoke or connecting body, the counterpressure elements 46 and 48 could also be fixed axially on a shaft 52, to which the gearwheel 2 is connected for rotation, for example, according to FIG. 2, and with which the latter is formed in one piece. For axially fixing the counterpressure elements 46 and 48, for example, a spring ring may be fastened to the shaft 52 in a shaft groove.

In the embodiments shown in FIGS. 1, 2 and 3, the disengager is the passive part which constantly generates the disengagement force, and the engager is the active part which is activated only when the toothed belt 6 is to be moved from the demeshed position of FIG. 1 into the meshed position of FIG. 3. The engager 14 overcomes the disengagement force of the disengager 16. After the engager 14 has been switched off, the disengagement spring means 30, 31, 32 and 33 of the disengager 16 again urges the toothed belt 6 from the meshed position of FIG. 3 into the demeshed position of FIG. 1.

Figure 4:
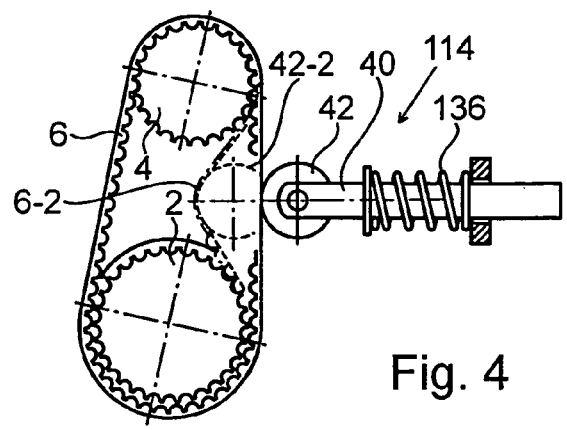
FIG. 4 shows diagrammatically, and not true to scale, a side view of a further embodiment of a shiftable toothed-belt drive according to the invention, the toothed belt being demeshed from a lower gearwheel according to the unbroken lines of FIG. 4 and according to FIG. 5, but also being capable of being meshed according to the broken lines of FIG. 4 and according to FIG. 6, while the toothed belt is constantly meshed with the other gearwheel.
Figure 6:
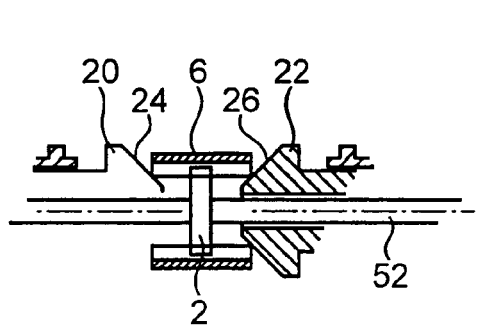
FIG. 6 shows the one gearwheel of FIG. 4, together with the disengager of the engagement and disengagement device in an engagement position, the toothed belt being in the meshed position with the gearwheel.
Figure 5:
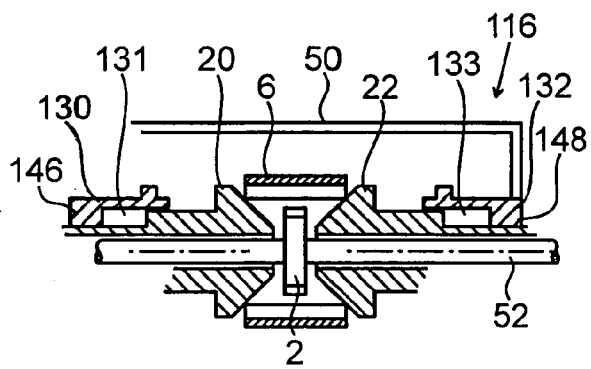
FIG. 5 shows the one gearwheel of FIG. 4, together with a disengager of an engagement and disengagement device in a disengagement position, the toothed belt, in its demeshed position, being spaced radially apart from the gearwheel.

The embodiment of FIGS. 4, 5 and 6, like FIGS. 1, 2 and 3, has two gearwheels 2 and 4 and a toothed belt 6 which can be alternately meshed with and demeshed from one gearwheel 2 and is constantly meshed with the other gearwheel 4. An engager 114 has, again, a tappet 40 with a roller 44. Furthermore, once again a belt pulley is provided, having the two pulleys 20 and 22 which are arranged on both sides of the one gearwheel 2 and are adjustable, for example displaceable or screwable, rotatably and axially in relation to this gearwheel 2. Moreover, a disengagement device 116 is provided, by means of which the two pulleys 20 and 22 can be moved, for example displaced, axially toward one another from a disengagement position of FIG. 5 into an engagement position of FIG. 6 to an extent such that the toothed belt 6 can be moved radially away from its meshed position, shown in FIG. 6, with the gearwheel 2 into the demeshed position, shown by unbroken lines in FIGS. 4 and 5, from the gearwheel 2. FIG. 4 also shows the meshed position of the toothed belt 6 by broken lines.

In the embodiment of FIGS. 4, 5 and 6, the engager 114 is the passive part which, by engagement spring means 136, for example comprised of one or more compression springs, constantly generates an engagement spring force, by means of which the tappet 40 together with the roller 44 can be moved from its disengagement position, shown by unbroken lines in FIG. 4, into the engagement position, shown by broken lines in FIG. 4, as long as the disengager 116 is not activated (switched on). When the disengager 116 is activated, it generates a disengagement force which overcomes the engagement force of the engagement spring means 136 of the engager 114 and thereby moves the pulleys 20 and 22 more closely together in relation to one another and in relation to the gearwheel 2 arranged between them, from the meshed position of FIG. 6 into the demeshed position of FIG. 5, so that the pulleys 20 and 22 lift off the toothed belt 6 radially from the gearwheel 2.

For this purpose, the disengager 116 has an actuating drive 130/132. The actuating drive 130/132 may be designed in various ways. It may have threaded spindles, for axially displacing the pulleys 20 and 22, in a threaded nut, one part of which is rotatable and the other part is nonrotatable. FIGS. 5 and 6 show an actuating drive 130/132 with linear servomotors 130 and 132 which act on the two pulleys 20, 22 and which can be jointly actuated in each case, for example electrically, pneumatically or hydraulically. FIGS. 5 and 6 show a pneumatic embodiment, in which an axially acting pressure chamber 131 and 133 for compressed air is formed in each case between the two pulleys 20 and 22 and two counterpressure elements 146 and 148. The two counterpressure elements 146 and 148 are arranged axially at a fixed location in relation to one another and in relation to the gearwheel 2 which is arranged between the pulleys 20 and 22. When the pressure chambers 131 and 133 are acted upon by compressed air, the pulleys 20 and 22 are pushed axially more closely together, counter to the engagement force of the engager 114, from the meshed position of the toothed belt 6 with the gearwheel 2 of FIG. 6 into the demeshed position of the toothed belt 6 from the gearwheel 2 of FIG. 5.

After the pressure has been cut back or vented in the pressure chambers 131 and 133, the two pulleys 20 and 22 are moved axially apart from one another by the engagement force of the engagement spring means 136 of the engager 114, as a result of the tensile stress generated in the toothed belt 6 by the engagement spring means 136. In this case, the toothed belt 6 urges the pulleys 20 and 22 axially apart from one another until the toothed belt 6 is meshed with the gearwheel 2 again.

In FIGS. 4, 5 and 6, parts corresponding to FIGS. 1, 2 and 3 are given the same reference numerals. In both embodiments, the toothed belt 6 runs on the conical or otherwise obliquely designed belt running surfaces 24 and 26 up and down between a smaller running surface diameter, in the toothed-belt meshing position in the upper half of FIG. 2 and in FIG. 6, and the relatively larger running surface diameter, at which the toothed belt 6 is in its demeshed position which is shown in the lower half of FIG. 2 and in FIG. 5. Although the axial distance between the counterpressure elements 46 and 48 is set at a fixed value, this distance value may be variably adjustable to any desired fixed values.

A shiftable toothed-belt drive according to the invention may consist in each case of one, of two or of a plurality of drive sets which are designed in each case according to the drive set of FIGS. 1 to 3 or to the drive set of FIGS. 4 to 6.

Figure 7:
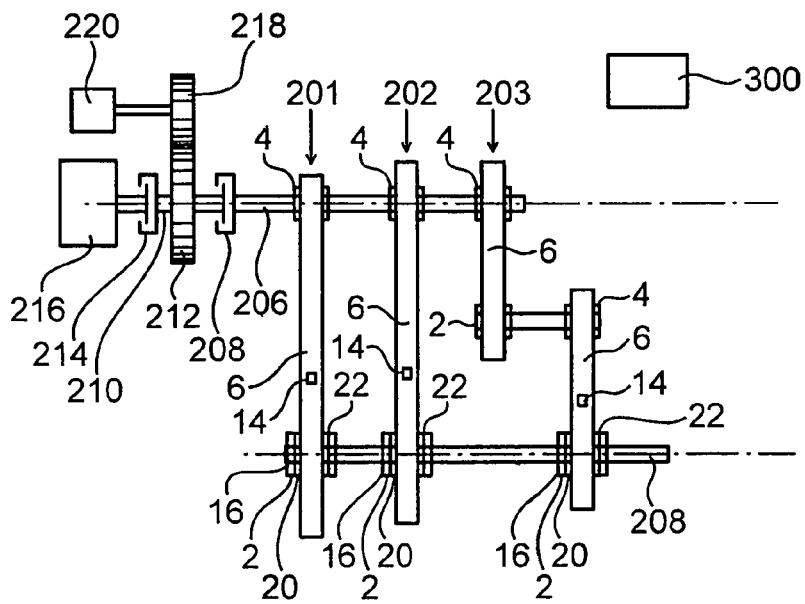
FIG. 7 shows a shiftable toothed-belt drive according to the invention with a plurality of drive sets according to FIGS. 1 to 3 (or FIGS. 4 to 6).

FIG. 7 shows a shiftable toothed-belt drive according to the invention with, for example, three drive connections 201, 202 and 203 between an input shaft 206 and an output shaft 208. Each of these drive connections 201, 202 and 203 contains at least one drive set according to FIGS. 1 to 3 or 4 to 6. In the embodiment of FIG. 7, the two drive connections 201 and 202 each contain one drive set according to FIGS. 1 to 3 (or according to FIGS. 4 to 6). The third drive connection 203 contains two drive sets, of which both or only one may be designed according to FIGS. 1 to 3 (or FIGS. 4 to 6), while the other drive set has only one toothed belt 6 on two gearwheels 2 and 4, but no engagement and disengagement device.

In FIG. 7, as an example, only the gearwheel 2 which is connected fixedly in terms of rotation to the output shaft 208 is provided with pulleys 20, 22 and with an engagement and disengagement device 14/16.

In FIG. 7, the gearwheels 2 which are provided with pulleys 20, 22 and with a disengager 16 are connected fixedly in terms of rotation to the output shaft 208 (or, in another embodiment, are connected fixedly in terms of rotation to the input shaft 208). The gearwheels 4 are connected fixedly in terms of rotation to the input shaft 206 (or, in the other embodiment, to the output shaft 208). Moreover, in the third drive connection 203, a gearwheel 2 and a gearwheel 4 are axially connected to one another fixedly in terms of rotation at the connection between the two drive sets.

The input shaft 206 can be coupled via a shiftable clutch 208 to an intermediate shaft 210 to which a gearwheel 212 is connected fixedly in terms of rotation. The intermediate shaft 210 can be coupled to an internal combustion engine 216 via a further shiftable clutch 214. A gearwheel 218, which is drive-connected to an electric machine 220, is meshed with the gearwheel 212 of the intermediate shaft 210. The electric machine 220 can thereby serve as a starter motor for starting the internal combustion engine 216 when one clutch 208 is opened and the other clutch 214 is closed. Furthermore, the electric machine 220 may be operated as an electric motor, in order, with one clutch 208 closed, to drive the driveshaft 206 and by the latter, via one of the drive connections 201, 202 or 203, the output shaft 208, either alone or together with the internal combustion engine 206. Preferably, the electric machine 220 can be driven as an electric motor alternately in one direction of rotation or the other, so that it not only can deliver drive energy for the forward drive of a vehicle, but can also serve as a drive motor for the reverse travel of the motor vehicle. Furthermore, it is advantageous if the electric machine 220 can also be operated as a generator for current generation, in which case it can be driven either by the internal combustion engine 206 or by the output shaft 208 via one of the drive connections 201, 202 or 203.

Shiftable toothed-belt drives according to the invention are suitable for the drive of any desired machine, but, in particular for the drive of motor vehicles, such as, in particular, cars, motorcycles and motor trucks, but also motorboats and motor ships. The shiftable toothed-belt drive with the drive connections 201, 202 and 203 and, if appropriate, with further or other drive connections may be a manually shiftable or an automatically shiftable gear-change transmission or, together with a torque converter, form an automatic transmission. The individual gear steps are formed in that, in the various drive connections 201, 202, 203, various transmission ratios are formed by means of different diameters of the gearwheels 2 and 4 and/or by means of one or more intermediate steps corresponding to the third drive connection 203 of FIG. 7.

For the shifting of gears, in each case at least one of the toothed belts 6 is demeshed from one of its gearwheels, for example the gearwheel 2, and then another toothed belt 6 is meshed with all its gearwheels 2, 4. For such a gear change, one of the clutches 208 or 214 is opened and, after the gear change, is closed again. In this case, there is also the possibility of operating the respective clutch 208 or 214, during a predetermined phase of the gear change, in the slipping mode (with sliding friction) as a function of predetermined criteria. As a result, shifts can be executed, for example, without any interruption in the traction of the drive trains. The clutches 208 and 214 are preferably multiple-disk clutches. The control of the gear-shifting operations, including the control of the clutch, is carried out by means of a control device 300.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A shiftable toothed-belt drive comprising:
a drive set comprising at least two toothed gearwheels rotatable on axially parallel radially offset axes, the gearwheels being radially spaced at a distance from each other, each of the gearwheels having respective similarly shaped toothing, a first one of the gearwheels has axially opposite sides;
a belt which extends around the gearwheels and the belt having an inside with internal toothing shaped for meshing with the toothing of the gearwheels, the belt having an outside;
an engagement and disengagement device positioned to act on the belt for selectively causing meshing of the toothing of the belt with the toothing on a first one of the gearwheels and for demeshing the belt from the toothing on the first gearwheel, the engagement and disengagement device being connected with the belt for lifting the belt radially from the first gearwheel from a meshed position into a demeshed position or for moving the toothed-belt radially so that the toothing thereon meshes with the toothing of the first gearwheel with the belt moving from the demeshed position into the meshed position;
the engagement and disengagement device further comprises:
a split belt pulley comprised of two pulleys, each pulley being respectively arranged at a respective axially opposite side of the first gearwheel and each pulley being respectively freely rotatable in relation to the first gearwheel, wherein the pulleys have axes of rotation which are in alignment with the axis of rotation of the first gearwheel;
each of the pulleys has an annular, radially outwardly facing, belt running surface which is oriented to descend radially in the direction toward the first gearwheel and toward the other one of the pulleys and the running surfaces being oriented obliquely to the axis of rotation of the pulleys, wherein the belt running surfaces of the two pulleys define between them a generally V-shaped groove on which the toothed belt is received;
at least one of the two pulleys being arranged to be axially movable in relationship to each other and in relationship to the first gearwheel;
the engagement and disengagement device further comprises a disengager positioned and connected for acting on the pulleys and for applying a disengagement force which urges the pulleys axially in the direction toward the belt and for pushing the pulleys axially toward one another to an extent such that when the toothed belt is running on the belt running surfaces of the pulleys, the belt running surfaces of the pulleys raise the toothed belt radially from the first gearwheel for moving the belt at the first gearwheel from the meshed position to the demeshed position;
the engagement and disengagement device further comprises an engager selectively movable into contact with the outside of the toothed belt, the engager being moveable transversely to the rotation axis of the first gearwheel and being moveable for applying an engagement force to the outside of the toothed belt for tensioning the toothed belt to a sufficient extent that the belt pressure on the running surfaces presses the two pulleys axially away from one another to an extent that when the toothed belt runs on the belt running surfaces of the pulleys, the toothed belt becomes seated radially onto the gearwheel such that the toothed belt is moved from the demeshed position to the meshed position with the gearwheel.

2. The shiftable toothed belt drive of claim 1, wherein the disengager comprises a disengagement spring for generating a disengagement force to prestress the pulleys resiliently and elastically in the direction toward the gearwheel and toward each other, the engager having an actuating drive operable for generating an engagement force sufficient to overcome the resiliently elastic disengagement force.

3. The shiftable toothed belt drive of claim 1, wherein the engager includes an engagement spring sufficient for generating an engagement force to cause engagement of the belt with the first gearwheel and;
the disengager including an actuating drive operable for generating a disengagement force applied to the pulleys which is sufficient to overcome the resiliently elastic engagement force.

4. The shiftable toothed belt drive of claim 1, further comprising an input shaft and an output shaft;
a drive train between the input shaft and the output shaft, including a plurality of drive connections in the drive train, at least two of the drive connections each having at least one of the drive sets including a respective one of the engagement devices and a respective one of the disengagement devices;
each of the drive connections being operable at a different respective rotational speed step-up ratio or rotational speed step-down ratio for enabling torque to be transmitted between the drive shafts alternately via various ones of the drive sets which define different respective gear steps.

5. The shiftable toothed belt drive of claim 4, wherein the drive sets are connected to the input and output shafts for defining a specific direction of rotation of the output shaft with respect to the input shaft which is the same for all the drive sets.

6. The shiftable toothed belt drive of claim 4, further comprising at least one electric machine in the drive train and the machine being either a motor for driving the shafts or as a generator for being driven by the shafts.

7. The shiftable toothed belt drive of claim 6, wherein the electric machine is connected with the drive train for driving the drive train in a rotation direction opposite to a direction of rotation in which the drive train is operable by an internal combustion engine.

8. The shiftable toothed belt drive of claim 4, further comprising a shiftable clutch in one of the drive trains, the clutch is operable for partially interrupting torque transmission by the clutch at a selected time, whereby a gear changing operation may be enabled.

9. The shiftable toothed belt drive of claim 8, wherein the clutch comprises a multiple disk clutch, including disks operable in a slipping mode with sliding friction, and the slipping mode being controllable as a function of selected operating criteria for enabling interruption and engagement of the clutch.

10. The shiftable toothed belt drive of claim 1, wherein the drive train is operable for use in a car, motorcycle, motorboat or motor ship.

11. A shiftable belt drive comprising:

a drive set comprising at least two toothed wheels rotatable on axially parallel radially offset axes, the wheels being radially spaced at a distance from each other; a first one of the wheels has axially opposite sides a belt which extends around the wheels having an inside toward the wheel and the belt being shaped for engaging the wheels and the belt having an opposite outside;

an engagement and disengagement device positioned to act on the belt for selectively causing engagement of the belt with a first one of the wheels and for disengaging the belt from the first wheel, the engagement and disengagement device being connected with the belt for lifting the belt radially from the first wheel from an engaged position into a disengaged position or for moving the belt radially to engage the first wheel with the belt moving from the disengaged position into the engaged position;

the engagement and disengagement device further comprises:

a pulley arranged at a respective axial side of the first wheel, the pulley is freely rotatable in relation to the first wheel, the pulley has an axis of rotation which is in alignment with the axis of rotation of the first wheel and the pulley is being arranged to be axially movable in relationship to the first wheel;

the pulley has an annular, radially outwardly facing, belt running surface which is oriented to descend radially in the direction toward the first wheel and the running surface being oriented obliquely to the axis of rotation of the pulley;

the engagement and disengagement device further comprises a disengager positioned and connected for acting on the pulley and for applying a disengagement force which urges the pulley axially in the direction toward the belt to an extent such that when the belt is running on the belt running surface of the pulley, the belt running surface of the pulleys raises the belt radially from the first wheel for moving the belt at the first wheel from the engaged position to the disengaged position;

the engagement and disengagement device further comprises an engager selectively movable into contact with the outside of the belt, the engager being moveable transversely to the rotation axis of the first wheel and being moveable for applying an engagement force to the outside of the belt for tensioning the belt to a sufficient extent that the belt pressure on the running surface presses the pulley axially away from belt to an extent that when the belt runs on the belt running surface of the pulley, the belt becomes seated radially onto the wheel such that the belt is moved from the disengaged position to the engaged position with the wheel.

* * * * *